(12) United States Patent
Swoboda et al.

(10) Patent No.: US 8,945,288 B2
(45) Date of Patent: Feb. 3, 2015

(54) DEVICE FOR SEPARATING PAINT OVERSPRAY

(75) Inventors: Werner Swoboda, Boeblingen (DE);
Erwin Hihn, Walddorfhaeslach (DE);
Kersten Link, Grafenau (DE); Gert Eberhard Kocher, Sindelfingen (DE)

(73) Assignee: Eisenmann AG, Boeblingen (DE)

( * ) Notice: Subject to any disclaimer, the term of this patent is extended or adjusted under 35 U.S.C. 154(b) by 703 days.

(21) Appl. No.: 13/058,169

(22) PCT Filed: Aug. 13, 2009

(86) PCT No.: PCT/EP2009/005865
§ 371 (c)(1),
(2), (4) Date: Feb. 8, 2011

(87) PCT Pub. No.: WO2010/025812
PCT Pub. Date: Mar. 11, 2010

(65) Prior Publication Data
US 2011/0203459 A1    Aug. 25, 2011

(30) Foreign Application Priority Data

Sep. 4, 2008 (DE) .......................... 10 2008 046 414

(51) Int. Cl.
*B03C 3/34* (2006.01)
*B05B 15/12* (2006.01)
(Continued)

(52) U.S. Cl.
CPC .............. *B05B 15/1244* (2013.01); *B03C 3/08* (2013.01); *B03C 3/16* (2013.01); *B03C 3/47* (2013.01); *B01D 53/323* (2013.01); *B05B 15/1262* (2013.01); *Y10S 55/46* (2013.01)
USPC .................. 96/62; 55/DIG. 46; 96/52; 96/53; 118/61; 118/326

(58) Field of Classification Search
CPC ............. B03C 3/00; B03C 3/16; B03C 3/38; B03C 3/40; B03C 3/41; B03C 3/74; B03C 3/78; B03C 3/88

USPC ............ 96/43–45, 47, 48, 50, 52, 53, 62, 73, 96/96, 98, 327, 328; 95/64, 65, 71, 75; 55/DIG. 46; 261/112.1; 118/61, 326
See application file for complete search history.

(56) References Cited

U.S. PATENT DOCUMENTS 2,899,183 A * 8/1959 Umbricht et al. ............... 261/24
3,248,857 A * 5/1966 Weindel et al. .................... 96/49
(Continued)

FOREIGN PATENT DOCUMENTS

DE    14 57 087 B1    5/1969
DE    15 57 159 A1    3/1970
(Continued)

*Primary Examiner* — Robert A Hopkins
*Assistant Examiner* — Sonji Turner
(74) *Attorney, Agent, or Firm* — Factor Intellectual Property Law Group, Ltd.

(57) ABSTRACT

A device for separating overspray from the cabin exhaust air of painting systems includes at least one separating surface, on which the exhaust air is guided and which is connected to a pole of a high voltage source. An electrode device arranged in the air stream is associated with the separating surface and connected to the other pole of the high voltage source. The separated paint overspray is transported away from the separating surface with a separating fluid, which flows over the separating surface-from top to bottom. A discharge device having a channel open at the top is present, from which the separating fluid exits along the longitudinal extension of the discharge device when the level of the separating fluid in the channel exceeds an exit level, and reaches the separating surface such that the separating fluid flows downward on the separating surface as a substantially adhering layer.

16 Claims, 16 Drawing Sheets

(51) Int. Cl.
  B03C 3/08 (2006.01)
  B03C 3/16 (2006.01)
  B03C 3/47 (2006.01)
  B01D 53/32 (2006.01)

(56) References Cited

U.S. PATENT DOCUMENTS

| | | | | |
|---|---|---|---|---|
| 3,390,400 | A | * | 6/1968 | Dock ............................... 454/54 |
| 3,504,738 | A | * | 4/1970 | McGuffey ..................... 165/117 |
| 3,785,125 | A | * | 1/1974 | DeSeversky ....................... 96/45 |
| 3,803,997 | A | * | 4/1974 | Van Raden ...................... 454/54 |
| 3,876,399 | A | * | 4/1975 | Saponaro ........................ 96/238 |
| 4,189,308 | A | * | 2/1980 | Feldman ........................... 95/75 |
| 4,466,993 | A | | 8/1984 | Hsu et al. |
| 4,597,780 | A | * | 7/1986 | Reif .................................. 96/45 |
| 5,137,546 | A | | 8/1992 | Steinbacher et al. |
| 5,160,510 | A | | 11/1992 | Steinbacher et al. |
| 5,264,014 | A | | 11/1993 | Lannefors et al. |
| 5,626,652 | A | * | 5/1997 | Kohl et al. ......................... 96/45 |
| 6,783,575 | B2 | * | 8/2004 | Pasic et al. ........................ 96/44 |
| 7,022,186 | B1 | | 4/2006 | Wilson |
| 2008/0216658 | A1 | * | 9/2008 | Maekawa et al. ................. 96/44 |
| 2008/0216659 | A1 | * | 9/2008 | Maekawa et al. ................. 96/44 |

FOREIGN PATENT DOCUMENTS

| | | | | |
|---|---|---|---|---|
| DE | 40 90 626 | T1 | 4/1992 | |
| DE | 41 23 285 | A1 | 1/1993 | |
| DE | 197 58 451 | A1 | 10/1998 | |
| EP | 0 461 695 | A1 | 12/1991 | |
| JP | 53-113374 | A | * 10/1978 | ......................... 96/45 |
| JP | 6-47310 | A | * 2/1994 | ......................... 96/45 |

* cited by examiner

DEVICE FOR SEPARATING PAINT OVERSPRAY

RELATED APPLICATIONS

This application claims the filing benefit of International Patent Application No. PCT/EP2009/005865, filed Aug. 13, 2009, which claims the filing benefit of German Patent Application No. 10 2008 046 414.7 filed Sep. 4, 2008, the contents of which are incorporated herein by reference.

TECHNICAL FIELD

The invention relates to a device for separating paint overspray from the exhaust air, laden with overspray, of a booth of painting plant, having
a) at least one separating surface along which the booth exhaust air can be guided and which is connected to a pole of a high-voltage source;
b) an electrode means which is arranged in the air stream and is associated with the separating surface and is connected to the other pole of the high-voltage source;
c) means which can be used to transport the paint overspray that is separated off away from the separating surface.

BACKGROUND OF THE INVENTION

When paints are applied manually or automatically to articles, some of the stream of paint, which in general contains both solids and solvents and/or binders, is not applied to the article. This portion of the stream is called overspray in the art. The overspray is taken up by the air stream in the spray booth and fed to a separation process.

In particular in the case of plant having a relatively high paint consumption, for example plant for painting vehicle bodies, wet separation systems are preferably used. In the wet separators known from the market, water flows, together with the exhaust air in the booth coming from above, to a nozzle that accelerates the flow of air. In this nozzle, the exhaust air flowing through from the booth is subjected to turbulence with the water. During this procedure, the particles of overspray are largely transferred to the water, with the result that the air leaves the wet separator substantially cleaned, and the particles of paint overspray are in the water. They can then be recovered therefrom or disposed of.

In the case of known wet separators, relatively large amounts of energy are needed to circulate the quite considerable quantities of water required. Because of the heavy use of paint-binding and adhesive-removing chemicals and because of the disposal of paint sludge, preparing the rinsing water is cost-intensive. Furthermore, the air takes up a very considerable amount of moisture as a result of its intensive contact with the rinsing water, and this in turn results in high energy consumption for the preparation of air in the circulation operation.

In contrast, in the case of devices known from the market of the type mentioned at the outset, separation is carried out in dry conditions, in that particles of paint overspray which are carried along by the exhaust air from the booth which flows past are ionised by the electrode means and, because of the electrical field that is formed between the separating surface and the electrode means, migrate to the separating surface and are separated off there. The particles of paint overspray which adhere to the separating surface can then for example be stripped mechanically therefrom and transported away.

Strippers of this kind have a very effective cleaning action. For continuous operation, however, it must always be ensured that it is possible for a sufficiently strong electrical field to be formed between the separating surface and the electrode means, and this is only possible up to a certain film thickness of paint overspray on the separating surface, since a film of this kind has an insulating action. The continuous removal of the paint overspray from the separating surface that is required entails highly complex structural measures, however, and can be susceptible to faults.

The present invention is directed to resolving these and other matters.

SUMMARY OF THE INVENTION

It is therefore an object of the present invention to provide a separating device of the type mentioned at the outset in which the transporting away of paint overspray from the separating surface is improved and simplified.

This object may be achieved in the case of a device of the type mentioned at the outset in that
d) the means for transporting away the paint overspray from the separating surface include a separating liquid which flows downwards over the separating surface;
e) a discharge means is provided which has an upwardly open channel out of which separating liquid supplied thereto flows along the longitudinal extent thereof when the level of separating liquid in the channel exceeds an outflow level and reaches the separating surface in such a manner that the separating liquid on the separating surface flows down as a largely cohesive film.

According to the invention, the advantage of good separation of paint overspray from the exhaust air of the booth by way of an electrical field is thus combined with good transport of paint overspray in a liquid, it being ensured at the same time that the separating liquid flows down the separating surface as a largely cohesive film.

This last point is particularly important since, otherwise, surface regions of the separating surface will be exposed for at least some of the time and not covered by separating liquid. However, paint overspray can be separated from these exposed surface regions. Over time, it is thus possible for an insulating film to be formed over the entire separating surface, which would greatly reduce the cleaning action of the separating device and would once again make manual cleaning necessary.

As a result of the discharge means, a particularly even supply of separating liquid is achieved, as a result of which the formation of a cohesive film on the separating surface is greatly favoured.

Advantageous further developments of the invention are specified in the dependent claims.

It is advantageous if the discharge means includes a drainage surface which is associated with the channel and runs parallel thereto and over which the separating liquid flowing out of the channel flows away laterally in the direction of the separating surface. It is possible for a cohesive film flowing towards the separating surface already to be formed on the drainage surface.

In this case, it is advantageous if the drainage surface merges along the channel into the edge thereof. This has the result that factors which break up the flow of separating liquid as it makes the transition from the channel to the drainage surface are avoided.

It is moreover advantageous if the drainage surface has a first section which is inclined outwards and upwards and merges into a second section which runs in a horizontal plane. As a result of the first section, the cross section of the space through which the separating liquid must flow is enlarged.

This reduces locally the rate of flow of the separating liquid. When the separating liquid flows onto the horizontal second section of the drainage surface at a reduced rate, a cohesive film thereof can readily be formed there.

The stream of separating liquid is again calmed and the formation of a cohesive film thereof favoured if the separating surface carries a brush element.

In a variant of the discharge means which has given good results, substantially vertical walls are arranged above the edges of the channel such that a slot running in the longitudinal direction of the channel is in each case left between them.

In a modified version of the discharge means which has also given satisfactory results, the channel tapers upwards into an outflow slot, with a bottleneck being provided in the path of flow of the separating liquid towards the outflow slot, with the result that the separating liquid is accelerated and undergoes turbulence there.

The stream of separating liquid can also be made even and hence a cohesive film formed therefrom and maintained if the channel and/or the associated drainage surface is provided with a grooved structure, preferably made of synthetic or rubber material, the grooves whereof extend in the longitudinal direction of the channel.

Particularly good results have been obtained in respect of the formation of a cohesive film of separating liquid using a discharge means which includes at least one roller projecting into the channel and rotatable about an axis of rotation which runs parallel to the longitudinal direction of the channel, with the result that separating liquid in the channel is carried upwards by the rotating roller, the drainage surface being the surface of a stripping element, in particular a resilient plate, which bears in the longitudinal direction of the roller against the outer surface thereof such that separating liquid carried along by the roller is stripped off and flows away, over the surface of the stripping element, in the direction of the separating surface.

It is advantageous if the separating liquid is supplied to the channel at below the outflow level. For example, a flow which has been calmed may be supplied from below in relation to the outflow level predetermined by the channel and/or the discharge means.

For this purpose, it is particularly advantageous if there is arranged in the channel, in the longitudinal direction thereof, at least one pipe on which separating liquid may act and along the longitudinal extent whereof a plurality of outlet openings is provided. Thus, separating liquid may act evenly on the channel over substantially its entire longitudinal extent.

It is favourable if the horizontal position of the channel in relation to a component carrying it is variable. A horizontal alignment of the channel favours the formation of a cohesive film along the channel. If the alignment of the channel can be adjusted separately, then the entire separating device does not need to be aligned in order to adjust the position of the channel.

In this context, for the same reasons it is advantageous if the horizontal position of the drainage surface associated with the channel in relation to a component carrying it is variable.

It is possible to achieve largely automatic horizontal alignment of the channel and/or the drainage surface if the channel and/or a component defining the drainage surface is/are mounted to be floating as a result of a carrier fluid.

The flow of the separating liquid out of the channel may be made more even, and the formation of a cohesive film thereof on the drainage surface may be favoured if a compressed air means is provided in the channel and may be used to blow compressed air, below the outflow level, from below onto the separating liquid level, with the result that waves are produced in the separating liquid in the region of the drainage surface.

As an alternative, a distributing medium, in particular a porous material, through which separating liquid may flow may be arranged in the channel in the longitudinal direction thereof.

In the case of a discharge means whereof the construction is kept relatively simple, the channel takes the form of a pipe having an upwardly pointing overflow slot which runs along the longitudinal extent of the pipe, with at least one further pipe being arranged below the pipe such that separating liquid flowing out of the upper pipe passes over the outer surface thereof and reaches the outer surface of the lower pipe and from there flows on to the separating surface.

With this construction of the discharge means, it is advantageous if the lower pipe is chargeable with separating liquid and has an outlet slot which runs along its longitudinal extent and by way of which separating liquid may be discharged in the direction of the separating surface.

It is to be understood that the aspects and objects of the present invention described above may be combinable and that other advantages and aspects of the present invention will become apparent upon reading the following description of the drawings and detailed description of the invention.

DETAILED DESCRIPTION OF THE PRESENT INVENTION

Figure 1:
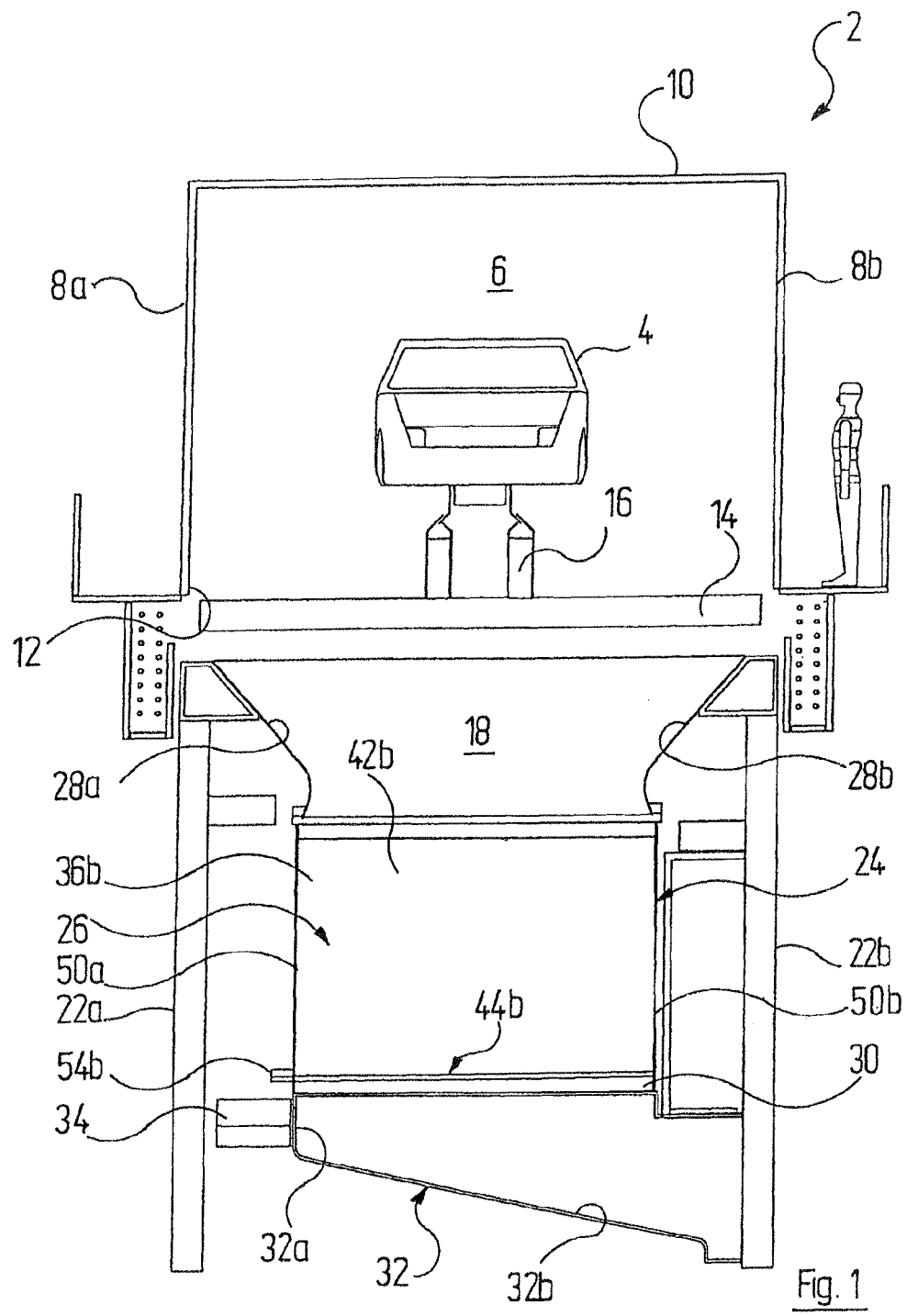
FIG. 1 shows a paint booth of a coating plant, with a first exemplary embodiment of an overspray separating device, in a front view.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 2:
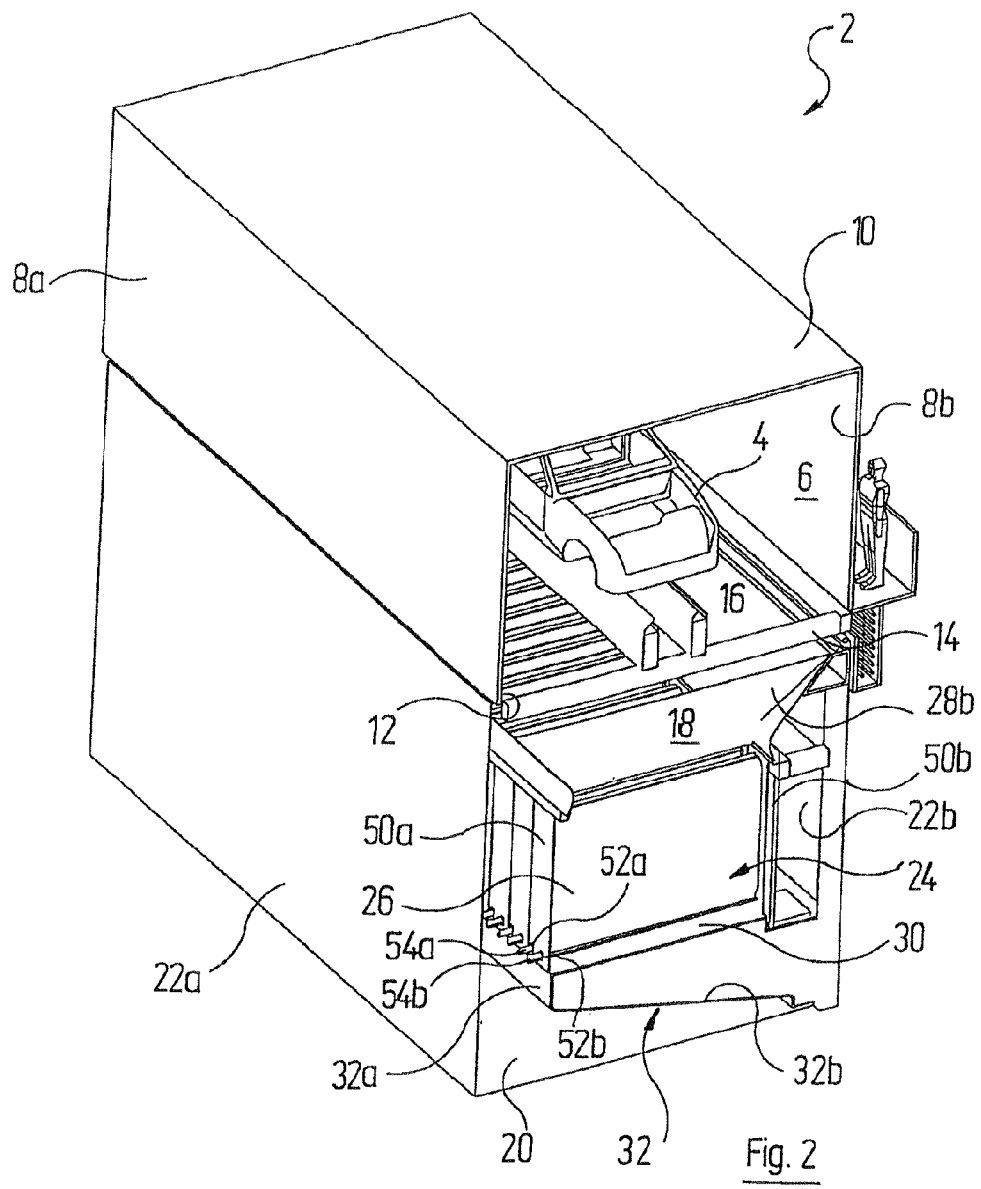
FIG. 2 shows the paint booth from FIG. 1, in a perspective view.

Reference will first of all be made to FIGS. 1 and 2. Here, 2 designates as a whole a paint booth of a coating plant in which vehicle bodies 4 are painted, after they have been cleaned and degreased for example in pre-treatment stations which are upstream of the paint booth 2 and are not themselves shown.

The paint booth 2 includes a painting tunnel 6 which is arranged at the top and is delimited by vertical side walls 8a, 8b and a horizontal booth ceiling 10 but which at the end sides and downwards is open such that exhaust air from the booth which is laden with overspray can flow downwards. The booth ceiling 10 takes the form, in conventional manner, of the lower delimitation of the air supply chamber (not illustrated), having a filter ceiling.

Arranged at the level of the lower opening 12 of the painting tunnel 6, which is flanked by the lower edges of the side walls 8a, 8b, is a steel structure 14 which carries a conveyor system 16 which is known per se and which is not described in more detail here. This can be used to transport vehicle bodies 4 that are to be painted from the entry side of the painting tunnel 6 to the exit side thereof. Inside the painting tunnel 6 there are application means which are not themselves shown and which can be used to apply paint to the vehicle bodies 4 in a manner known per se.

Below the lower opening 12 of the painting tunnel 6 there is a separating chamber 18 which is upwardly open, towards the painting tunnel 6, and in which paint overspray which arises during the painting procedure is separated off.

The separating chamber 18 is delimited by a base plate 20 (visible in FIG. 2), two vertical side walls 22a, 22b and two vertical end walls, with these last being omitted from FIGS. 1 and 2. Arranged in the separating chamber 18 is a separating device 24 having a plurality of separating units 26 which are arranged one behind the other in the longitudinal direction of the separating chamber 18 and which will be described in more detail below.

In the region of the separating chamber 18 between the separating device 24 and the painting tunnel 6 there are two air baffles 28a, 28b which, starting from the side walls 22a, 22b of the separating chamber 18, first converge downwards and, in their end region facing the separating device 24, diverge towards the lateral delimitations of the separating device 24. The air baffles 28a, 28b and corresponding air baffles (not illustrated) at the end sides extend downwards as far as the separating device 24.

The separating units 26 rest on a carrying frame 30 which allows air to flow downwards out of the separating device 24. Below the separating device 24 there is a further air baffle 32 which extends along the separating device 24 in the separating chamber 18. The air baffle 32 has a vertical section 32a which faces the side wall 22a of the separating chamber 18, on the left in FIGS. 1 and 2, and a section 32b which runs obliquely downwards in the direction of the opposing side wall 22b of the separating chamber 18. Between the vertical section 32a of the air baffle 32 and the side wall 22a of the separating chamber 18, on the left in FIGS. 1 and 2, there is arranged a collecting channel 34, shown only schematically in FIG. 1, which extends parallel to the vertical section 32a of the air baffle 32 and is inclined in the longitudinal direction in relation to a horizontal plane.

Figure 3:
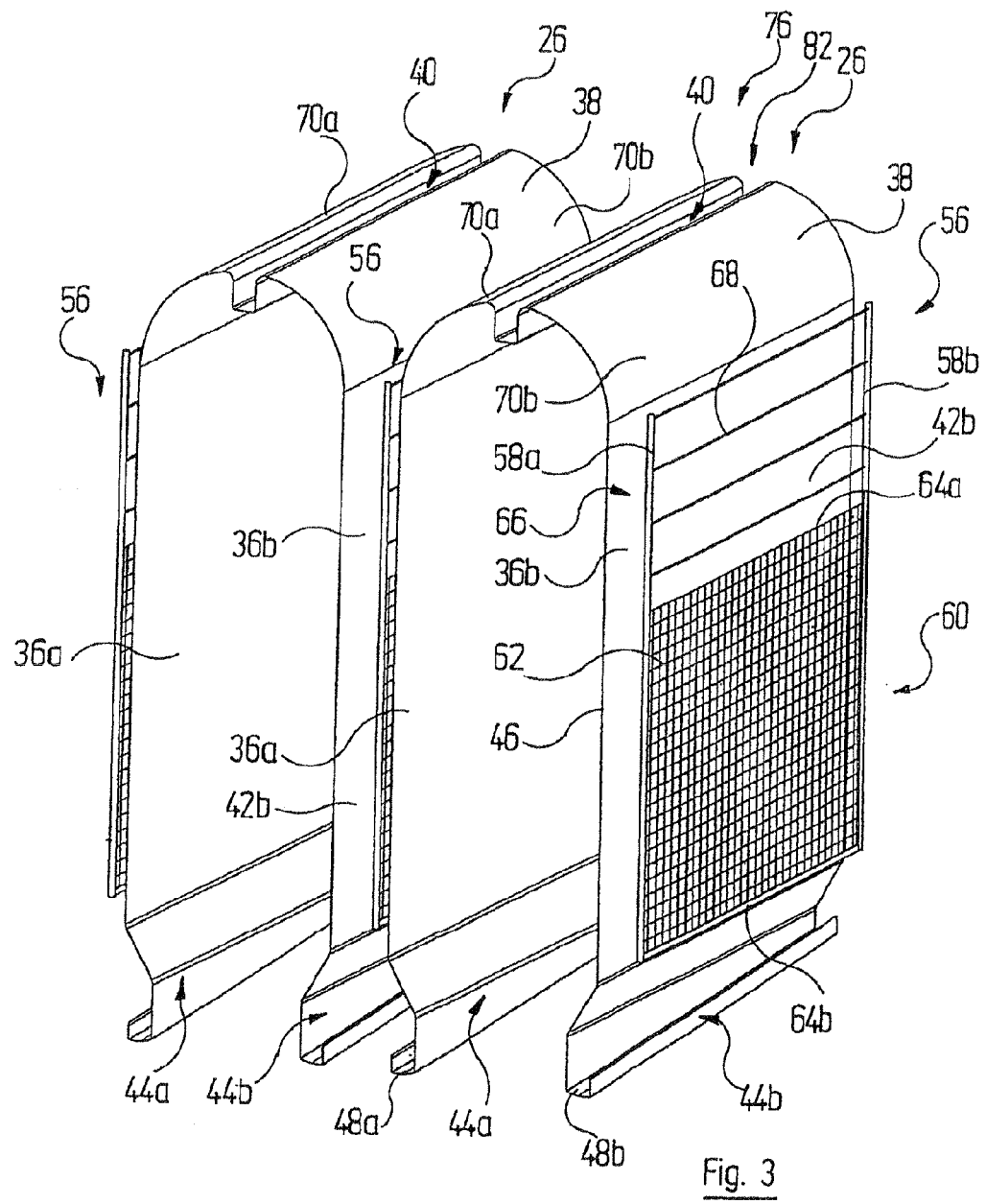
FIG. 3 shows a perspective view of two separating units and three electrode means of the separating device from FIG. 1.
Figure 4:
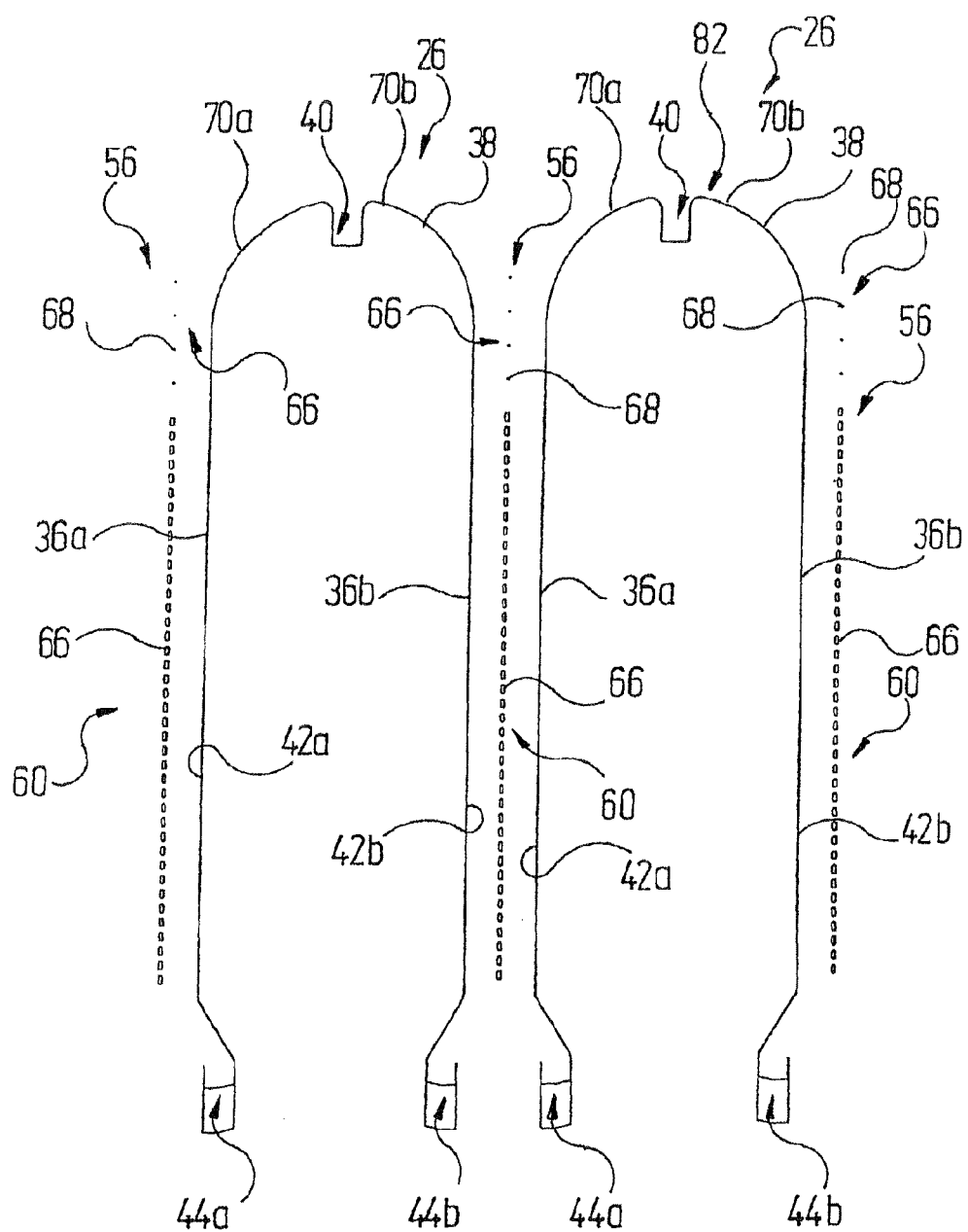
FIG. 4 shows the two separating units with electrode means from FIG. 3, in vertical section.

FIGS. 3 and 4 show two adjacent separating units 26 of the separating device 24. As can be seen there, a separating unit 26 includes two parallel, mutually spaced rectangular side panels 36a, 36b which are connected to one another at their upper opposing end edges by a curved section 38 whereof the cross section of the internal shape of the outer contour corresponds to a semicircle and forms the upper side of the separating unit 26.

At its apex, the curved section 38 of the separating units 26 is constructed to have the form of an overflow channel 40, about which more details will be given below.

The respective outer surfaces of the side panels 36a, 36b form separating surfaces 42a and 42b respectively, about which, again, more details will be given below.

At their lower edges, the side panels 36a, 36b each carry a drainage channel 44a, 44b which runs parallel to the side panels 36a, 36b of the separating units 26 and is inclined downwards in the direction of a first end side 46 of the separating unit 26, at the front in FIG. 3. The drainage channels 44a, 44b terminate at their end sides with the side panels 36a, 36b of the separating unit 26 (cf. FIG. 3). At their end 48a and 48b respectively, the drainage channels 44a, 44b are open at the first end side 46 (cf. FIG. 3) of the separating unit 26.

As can be seen in FIGS. 1 and 2, each separating unit 26 includes a first end wall 50a which is arranged on the first end side 46 thereof. The opposing end side of the separating units 26, which is not provided with its own reference numeral, is covered by a second end wall 50b. The end walls 50a, 50b of the separating units 26 close off the end sides of the associated overflow channel 40. The two end walls 50a, 50b are made from synthetic material. The first end wall 50a of the separating unit 26 includes two apertures 52a, 52b into which a respective drainage channel 44a, 44b opens at its ends 48a, 48b. On the side of each side wall 50a opposed to the drainage channels 44a, 44b, drip trays 54a, 54b are mounted at the apertures 52a, 52b. These take the form of a profiled section whereof the cross section corresponds to that of the drainage channels 44a, 44b.

When the separating device 24 is arranged in the separating chamber 18 of the paint booth 2, the drip trays 54a, 54b of each separating unit 26 project beyond the collecting channel 34.

In the separating device 24, each pair of adjacent separating units 26 is arranged with a spacing maintained between them. Between two adjacent separating units 26 and, in the case of the free side panels 36a and 36b respectively of the two outermost separating units 26, within the separating unit 24 there extends a respective electrode means 56, each one connected to a high-voltage source which is not itself shown in FIG. 4. In a modified version, the electrode means 56 may also be supplied from a single high-voltage source. The separating units 26 are at earth potential.

Each electrode means 56 includes two straight and mutually parallel electrode strips 58a, 58b. These hold a grid electrode 62 in a field section 60 of the electrode means 56, the edges 64a, 64b of the grid electrode 62 which extend between the electrode strips 58a, 58b being perpendicular thereto. In a corona section 66 of the electrode means 56, the electrode strips 58a, 58b hold a plurality of corona wires 68 which function as a discharge electrode. The corona wires 68 run in a plane predetermined by the electrode strips 58a, 58b, parallel to the edges 64a, 64b of the grid electrode 62, and are arranged at the same spacing from one another.

As can be seen in FIGS. 3 and 4, the overall extent of the electrode means 56 corresponds substantially to the extent of the side panels 36a, 36b of the separating units 26. The electrode means 56 are arranged such that the lower edge 64b of the grid electrode 62 is arranged approximately at the level of the lower end of the side panels 36a and 36b.

When the separating device 24 is in operation, a separating liquid, which is suitable for taking up solid particles from the paint overspray arising during the painting procedure, flows down each separating surface 42a, 42b of the side panels 36a, 36b of the separating units 26, into the drainage channels 44a, 44b.

For this purpose, this separating liquid is supplied to the overflow channel 40 in the curved section 38 of the separating units 26. From there the separating liquid passes over the curved flanks 70a, 70b of the curved section 38 of the separating unit 26, which run next to the overflow channel 40, in each case as a cohesive film, to reach the side panels 36a, 36b and flows down the separating surfaces 42a, 42b thereof as a still cohesive film of separating liquid.

The number of corona wires 68 of the electrode means 56, and their spacing from one another, may vary as a function of the separation behaviour of the overspray particles. In the present exemplary embodiment, four corona wires 68 are provided, of which the topmost is arranged next to the curved section 38 of the separating unit 26, whereas the corona wire 68 below it is still in the region of the respective side panel 36a or 36b of the separating unit 26.

Figure 5:
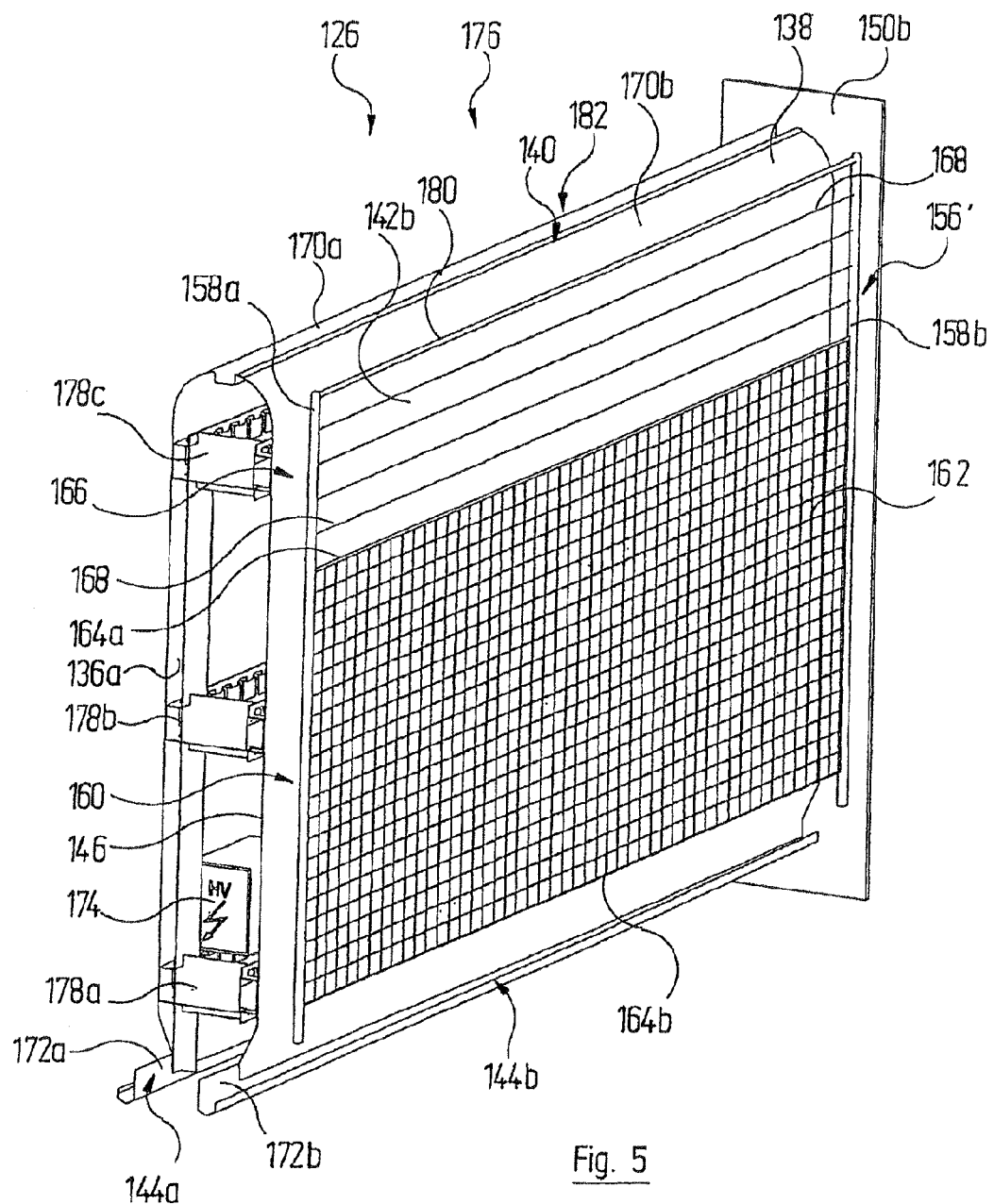
FIG. 5 shows a perspective view of two separating units and three electrode means, in each case according to a second exemplary embodiment.
Figure 6:
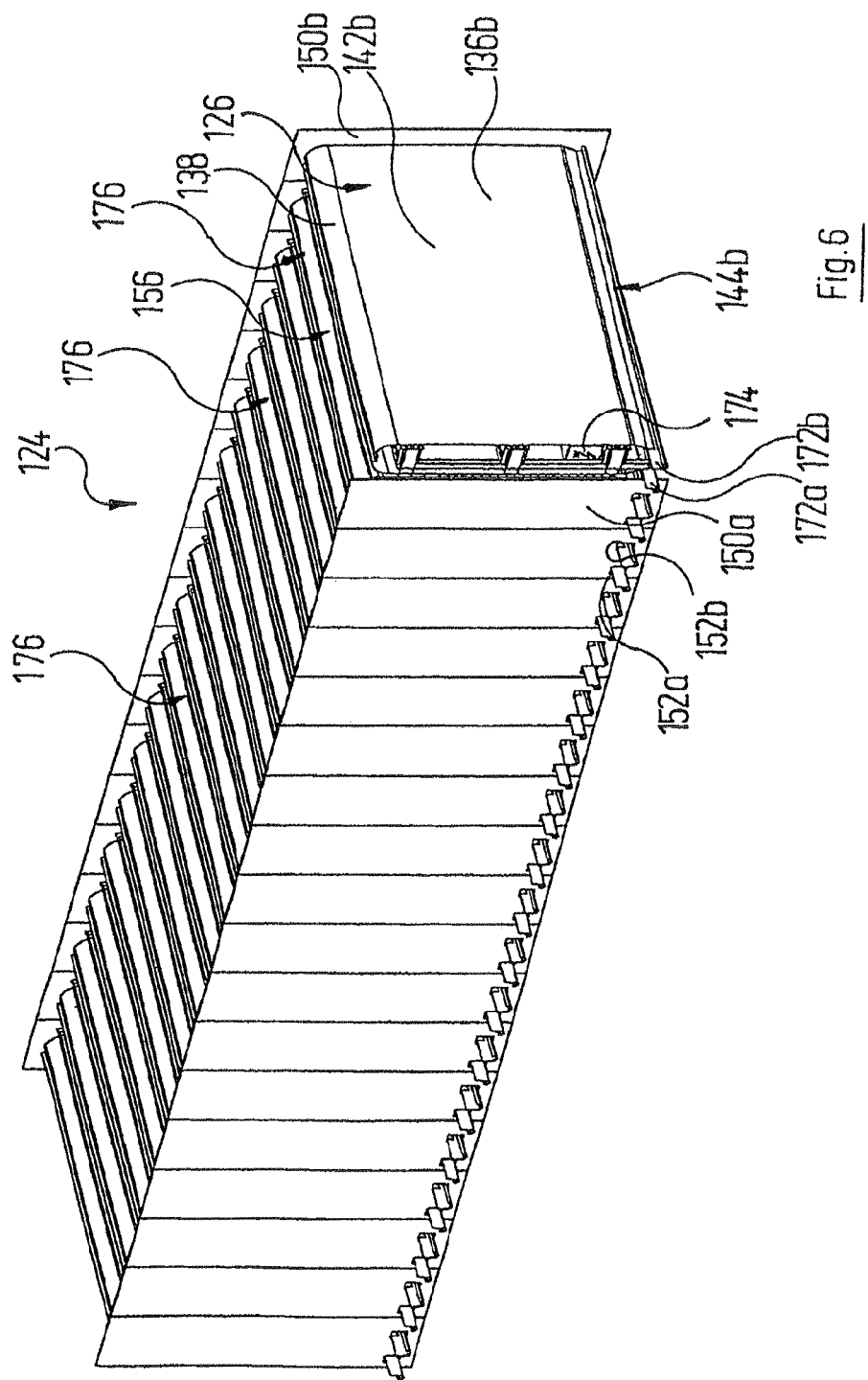
FIG. 6 shows a perspective view of a second exemplary embodiment of an overspray separating device which includes a plurality of separating units and electrode means from FIG. 5.

FIG. 5 shows, in each case as a second exemplary embodiment, a modified separating unit 126 and a modified electrode means 156, and FIG. 6 shows a modified separating device 124 which includes these. Components of the separating unit 126, the electrode means 156 and the separating device 124 that correspond to those of the separating unit 26, the electrode means 56 and the separating device 24 in FIGS. 1 to 4 are designated by the same reference numerals plus 100.

The separating unit 126 differs from the separating unit 26 among other things in that the drainage channels 144a, 144b project beyond the end side 146 of the separating unit 126. The projecting sections 172a, 172b correspond to the drip trays 54a, 54b described above, and for this reason they need not be described in connection with the separating device 124.

As can be seen in FIG. 6, the projecting sections 172a, 172b of the drainage channels 144a, 144b of the separating unit 126 extend through the respective apertures 152a, 152b in each end wall 150a of the separating device 124.

FIG. 5 shows a high-voltage source 174 which is arranged between the side panels 136a, 136b of each separating unit 126 and is connected to the electrode means 156. The high-voltage source 174 may also, correspondingly, be provided for each separating unit 26 according to the first exemplary embodiment. In each case, an individual separating unit 126 and an individual electrode means 156 in this way form a separating module 176. Accordingly, an individual separating unit 26 and an individual electrode means 56 in each case form a separating module 76 in FIGS. 1 to 4.

In FIG. 5, struts 178a, 178b, 178c are also visible, and these connect to one another the inner faces of the two side panels 136a, 136b of the separating unit 126 at the bottom, in the centre and at the top.

In the case of the electrode means 156 according to the second exemplary embodiment, a protective rod 180 runs perpendicularly between the electrode strips 158a, 158b above the topmost corona wire 168 and reduces the risk that objects or particles which may fall out of the painting tunnel 6 and onto the electrode means 156 will come into contact with the corona wires 168.

Otherwise, what was said above in relation to the separating unit 26, the electrode means 56 and the separating device 24 also applies correspondingly to the separating unit 126, the electrode means 156 and the separating device 124.

The basic principle of the devices described above will now be explained by way of the example of the separating device 24 according to FIGS. 1 to 4. Use of the separating device 124 according to FIGS. 5 and 6 in the paint booth 2 is performed in similar manner.

When the vehicle bodies are painted in the painting tunnel 6, the booth air there is laden with particles of paint overspray. These may still be liquid and/or tacky, but may also already be more or less solid. The exhaust air from the booth that is laden with paint overspray flows through the lower opening 12 of the painting tunnel 6 and into the separating chamber 18. There, this air is deflected by the air baffles 28a, 28b in the direction of the separating device 24 and flows through between adjacent separating units 26 in the direction of the lower air baffle 32.

At the corona wires 68, corona discharges occur in a manner known per se, and these effectively ionise the overspray particles in the exhaust air from the booth which flows past.

The ionised overspray particles move past the earthed side panels 36a, 36b of two adjacent separating units 26 and the grid electrode 62 between them, in the first section 60 of the electrode means 56. Because of the electrical field formed between the grid electrode 62 and the side panels 32a, 32b, the ionised overspray particles are separated at separating surfaces 42a, 42b of the side panels 36a, 36b of the separating units 26 and are taken up there by the separating liquid flowing along it.

Some of the ionised overspray particles are already separated off at the separating units 26 in the second section 66 of the electrode means 56 in the region of the corona wires 68. The electrical field between the corona wires 68 and the respective side panel 36a, 36b of the separating unit 26 is more inhomogeneous than the electrical field in the region of the grid electrode 62, however, and for this reason separation of the ionised overspray particles at the corresponding separating unit 26 is more directed and more effective there.

The air which is cleaned as it passes between the separating units 26 is deflected, by the lower air baffle 32, in the direction of the side wall 22 b of the separating chamber 18, shown on the right in FIGS. 1 and 2, and from there can be supplied to the painting tunnel 6 again as fresh air, where appropriate after undergoing certain treatment. The treatment may in particular be a readjustment of the temperature, the air humidity and where appropriate the removal of solvents that are still present in the air.

The separating liquid which flows down over the separating units 26 and is now laden with the overspray particles goes down into the drainage channels 44a, 44b of the separating units 26. As a result of the inclination of the drainage channels 44a, 44b, the laden separating liquid flows in the direction of the apertures 52a, 52b in the respective end walls 50a, through these and from there via the drip trays 54a, 54b into the collecting channel 34. The separating liquid laden with overspray particles flows through the collecting channel 34 and out of the paint booth 2 and may be supplied to a cleaning and re-preparation step, in which the overspray particles are removed from the separating liquid, or to a disposal step.

In the exemplary embodiments of the separating units 26, 126 shown in FIGS. 1 to 6, the respective overflow channel 40 or 140 forms a discharge means 82 or 182 which takes the form of an overflow means and through which the separating liquid reaches the separating surface 42a, 42b or 142a, 142b such that the separating liquid flows down the separating surface 42a, 42b, 142a, 142b as a largely cohesive film. During this, the separating liquid flows out of the channel 40, 140 along the longitudinal extent thereof if the level of separating liquid in the channel 40, 140 exceeds an outflow level.

The overflow channel 40, 140 is arranged between the curved flanks 70a, 70b and 170a, 170b of the curved section 38, 138 of the separating unit 26, 126 and is connected thereto such that the outer surface of the overflow channel 40, 140 merges more or less seamlessly into the outer surface of one of the two curved flanks 70a, 70b, 170a, 170b.

Further exemplary embodiments of the discharge means will be explained below with reference to FIGS. 7 to 17. Here, indications of direction, such as horizontal, vertical, above or below always refer to a separating unit 26, 126 which is ready for operation.

Figure 7:
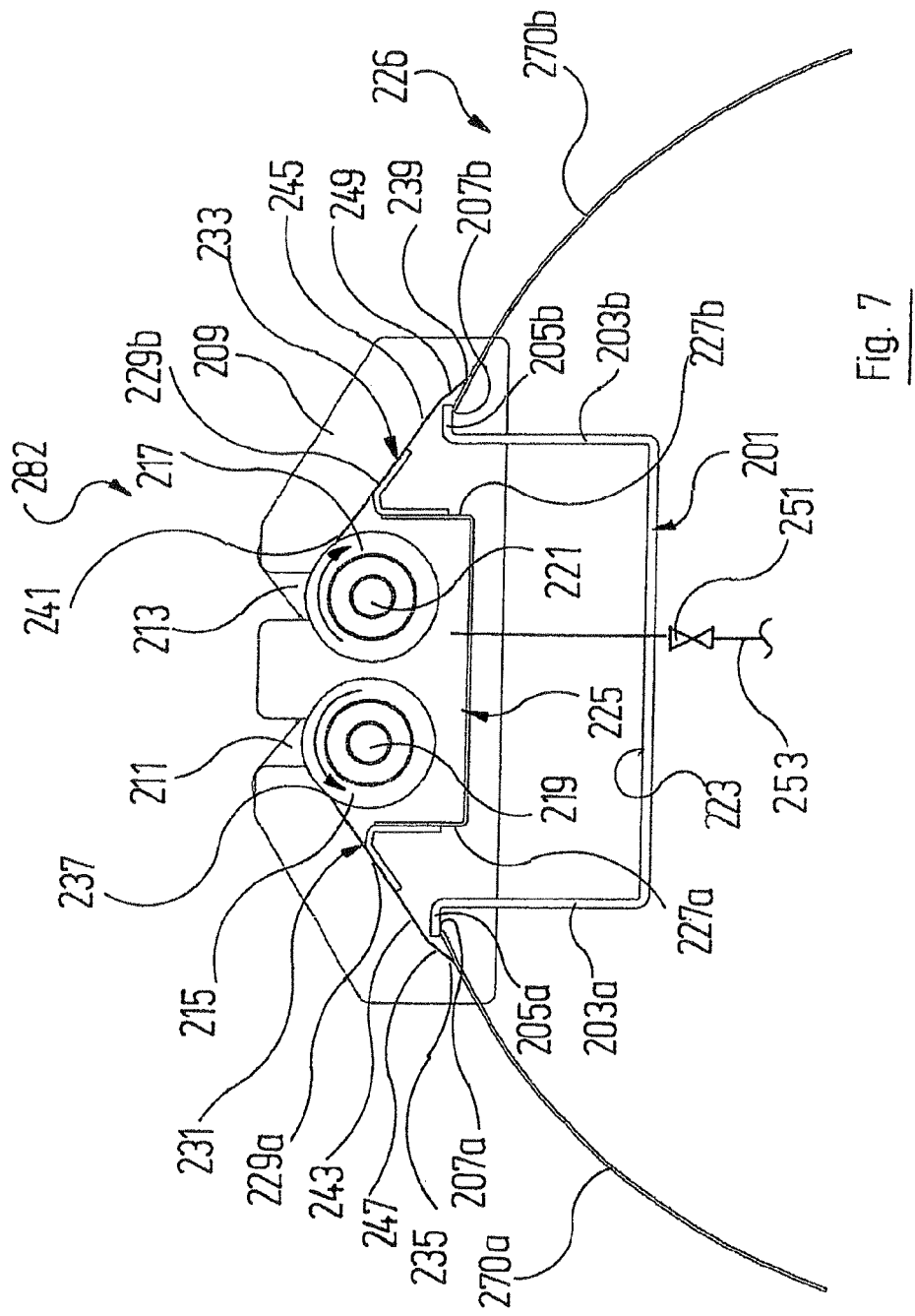
FIGS. 7 to 17 show exemplary embodiments of discharge means which may be used to supply a separating liquid to separating surfaces of the separating units.

FIG. 7 shows, as a further exemplary embodiment, a discharge means 282. Here, components corresponding to those of the discharge means 82 are designated by the same reference numerals plus 200.

The discharge means 282 includes a carrying trough 201 which is arranged between the curved flanks 270a, 270b of the separating unit 226 and extends between the end walls 250a, 250b (not visible in FIG. 7) thereof. The side walls 203a, 203b of the carrying trough 201 are bent outwards at their upper end to form receiving sections 205a, 205b by means of which the receiving trough 201 lies on the opposing ends 207a, 207b of the curved flanks 270a, 270b of the separating unit 226.

Mounted on each end side of the receiving trough 201 is a bearing unit 209 which projects upwards beyond the curved flanks 270a, 270b of the separating unit 226. The bearing units 209, of which only one is visible in FIG. 7, receive first flanged bearings 211 and second flanged bearings 213. The first flanged bearings 211 bear a rotatable first roller 215 and the second flanged bearings 213 bear a rotatable second roller 217. The axes of rotation 219, 221 of the rollers 215, 217 run in a horizontal plane parallel to one another in the longitudinal direction of the carrying trough 201, with a spacing remaining between the outer surfaces of the rollers 215, 217. The vertical position of the flanged bearings 211, 213 may be varied, as a result of which it is possible for the alignment of the rollers 215 and 217 to be adjusted in relation to a horizontal plane.

The rollers 215, 217 may be driven by drive means (not themselves illustrated here) such that the roller arranged on the left as seen in cross-section—which in FIG. 7 is the roller 215—is rotated anticlockwise and the roller arranged on the right as seen in cross-section—which in FIG. 7 is the roller 217—is rotated clockwise. This is indicated in FIG. 7 by corresponding arrows.

A region of the rollers, 215, 217 lying below the plane defined by their axes of rotation 219, 221 projects into a channel 225 which may be filled with the separating liquid, with the result that the rollers 215, 217 then dip into the separating liquid in this region. The channel 225 is held by the carrying trough 201 by way of connection members (not themselves illustrated). The vertical side walls 227a, 227b of the channel 225 carry on the outside holders 229a, 229b for resilient plates 231 and 233 which serve as drainage surfaces, associated with the channel 225, for the separating liquid.

The first resilient plate 231, held by the holder 229a, lies by means of a longitudinal edge 235 on the curved flank 270a of the separating unit 226. By contrast, the opposing longitudinal edge 237 of this resilient plate 213 bears against the outer face of the roller 215, on the side thereof pointing in the direction of the side wall 227a of the channel 225. Correspondingly, the second resilient plate 233 lies by means of a longitudinal edge 239 on the curved flank 270b of the separating unit 226, and its opposing longitudinal edge 241 bears against the outer face of the roller 217, on the side thereof pointing in the direction of the side wall 227b of the channel 225. The resilient plates 231, 233 each have a planar section 243, 245 which starts from the rollers 215, 217 and merges into a section 247 and 249 respectively which inclines downwards with respect to these but is also planar and for its part ends in the longitudinal edges 235 and 239.

The resilient plates 231, 233 are carried by the holders 229a, 229b such that, starting from the longitudinal edges 237, 241 bearing against the rollers 215, 217, their planar sections 243, 245 run inclined downwards. The holders 229a, 229b are adjustable, with the result that the position of the resilient plates 231, 233 can be adapted to the position of the rollers 215, 217.

When the separating unit 226 is in operation, the channel 225 is filled with the separating liquid from a reservoir (not itself shown) by way of a supply line 253, which is provided with a shut-off valve 251, from below such that the rollers 215, 217 dip into the separating liquid. The rollers 215, 217 are turned in their respective direction of rotation, as a result of which separating liquid is carried along by the rollers 215, 217 and thus flows out of the top of the channel 225 and reaches the longitudinal edges 237, 241 of the resilient plates 231, 233. The resilient plates 231, 233 strip the separating liquid from the rollers 215, 217, and it then passes, in the form of a cohesive film, over the resilient plates 231, 233 to reach the curved flanks 270a, 270b of the separating unit 226 and over these, in the form of a cohesive film, to reach the separating surfaces 242a, 242b of the separating unit 226, which are not shown in FIG. 7.

Where the level to which the channel 225 is filled with separating liquid is concerned, all that needs to be taken into account is that the rollers 215, 217 always dip into the separating liquid.

Figure 8:
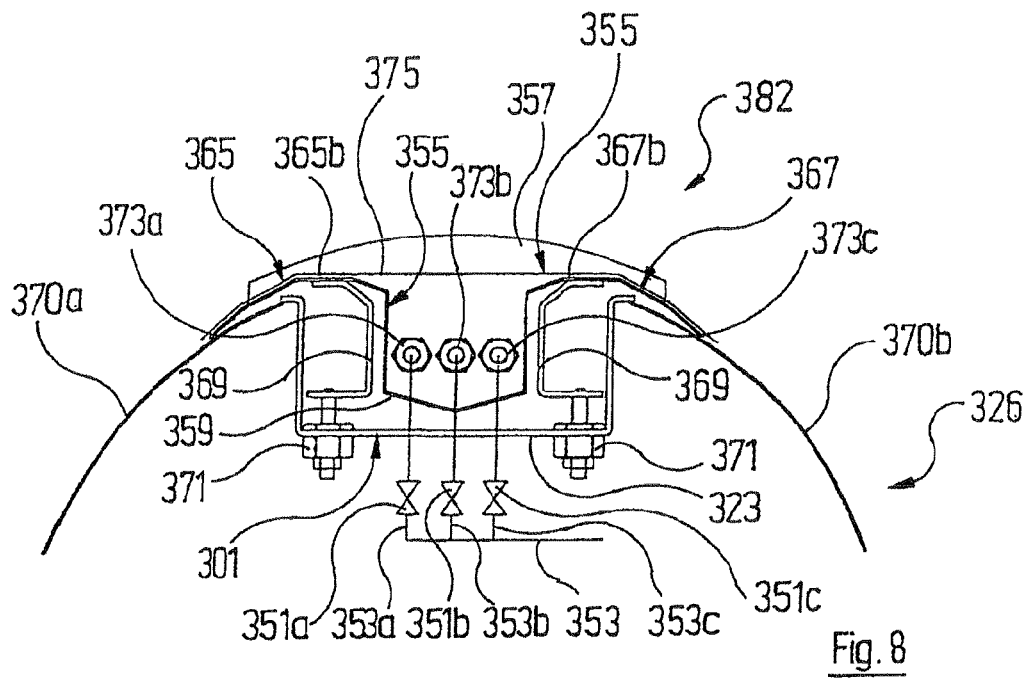

FIG. 8 shows, as a further exemplary embodiment, a discharge means 382 which takes the form of an overflow means. Here, components corresponding to those of the discharge means 282 in FIG. 7 are designated by the same reference numerals plus 100.

The discharge means 382 includes an overflow channel 355 which extends in the longitudinal direction of the separating unit 326, between two end walls 357 which terminate at the end sides thereof, of which only one is visible in FIG. 8.

Figure 9:
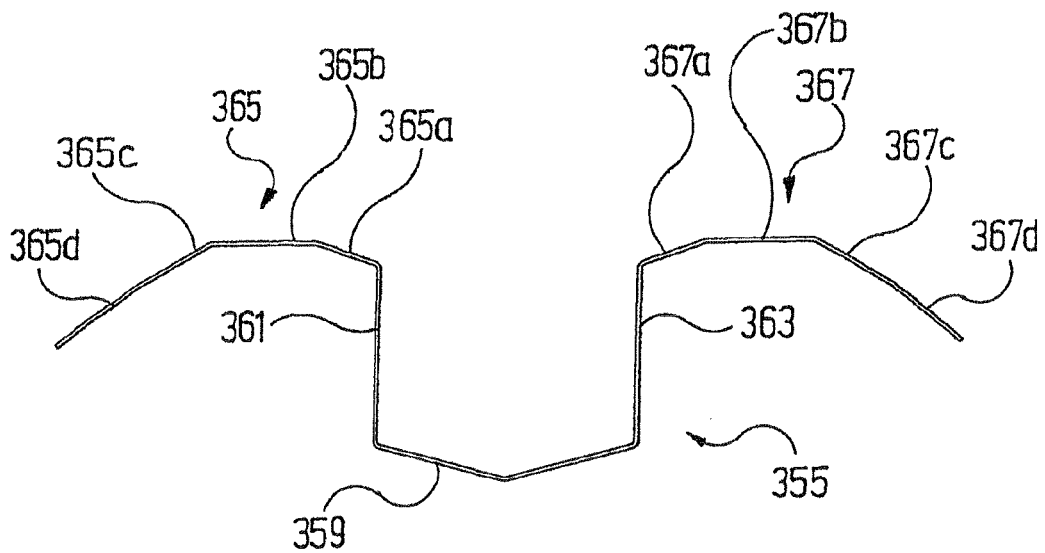

The overflow channel 355 is illustrated in FIG. 9 on a larger scale than that in FIG. 8. As can be seen there, it has a V-shaped floor 359 and two vertical side walls 361, 363. At their respective upper edges, the side walls 361, 363 each carry an overflow wing 365, 367. The two overflow wings 365, 367 extend over the entire length of the overflow channel 355 and serve as drainage surfaces, associated with the overflow channel 355, for the separating liquid.

Starting from the side walls 361, 363, the overflow wings 365, 367 have upwardly inclined first sections 365a, 367a which each merge respectively into a second section 365b, 367b. The second sections 365b, 367b, lie in a common horizontal plane. Adjoining the second sections 365b, 367b are third sections 365c and 367c respectively, which—as seen towards the outside—are inclined downwards.

An end section 365d and 367d respectively, which adjoins the inclined third sections 356c, 367c, is—as seen towards the outside—inclined more sharply downwards than the adjacent sections 365c, 367c.

As can be seen in FIG. 8, the overflow channel 355 bears by means of the horizontal sections 365b, 367b of its overflow wings 365, 367 on spacer members 369 which are connected by way of setscrews 371 to the floor 323 of the receiving trough 301.

The overflow channel 355 of the discharge means 382 is supplied with separating liquid by way of the supply line 353. In the direction of the overflow channel 355, this divides into three lines 353a, 353b, 353c, in each of which a respective shut-off valve 351a, 351b, 351c is arranged. The lines 353a, 353b, 353c lead to a respective charging pipe 373a, 373b, 373c. The charging pipes 373a, 373b, 373c extend in the longitudinal direction of the overflow channel 355 close to the floor 359 thereof and are provided, along their longitudinal extent, with lateral outlet openings which are not visible in FIG. 8. Thus, the separating liquid is supplied to the overflow channel 355 below the outflow level at which, when the latter is exceeded, the separating liquid flows out over the top of the overflow channel 355.

Correspondingly, the supply line 253 in the discharge means 282 according to FIG. 7 may also divide into three lines in each of which a respective shut-off valve is arranged and which lead to a respective charging pipe which corresponds to the charging pipe 373a, 373b or 373c of the discharge means 382. The channels 40, 140 of the discharge means 82 and 182 (cf. FIGS. 3 and 5) may also be supplied with the separating liquid in this way.

The position of the overflow channel 355 and in particular its inclination in relation to the receiving trough 301 can be adjusted by way of the setscrews 371 in conjunction with the spacer members 369, of which in each case a plurality are provided along the overflow channel 355. As a result it is possible to adapt the position of the overflow channel 355 with its overflow wings 365 and 367 in relation to a horizontal plane and in relation to the separating unit 326 or its curved flanks 370a, 370b.

In the discharge means 382, the overflow channel 355 is fed with separating liquid by way of the charging pipes 373, it being possible to adjust the feed quantity thereof by closing or releasing the shut-off valves 351a, 351b, 351c. These may alternatively also be valves of adjustable throughflow cross section.

Separating liquid is fed to the overflow channel 355 such that the level thereof in the overflow channel 355 rises and the separating liquid flows out at the top and, by way of the upwardly inclined first sections 365a, 367a reaches the horizontal second sections 365b and 367b of the overflow wings 365 and 367, where in each case a cohesive film of the separating liquid is formed. These cohesive films of separating liquid on both overflow wings 365, 367 of the overflow channel 355 then flow, still as cohesive films, over the downwardly inclined third sections 365c, 365c and end sections 367d, 367d of the overflow wings 365, 367 to the curved flanks 370a, 370b of the separating unit 326. From there, the separating liquid flows—as already explained above—in each case still as a cohesive film to the separating surfaces 342a, 342b of the separating unit 326. The liquid level of the separating liquid after it has exceeded the outflow level provided for by the overflow channel 355 is indicated in FIG. 8 in the region of the overflow channel 355 with its overflow wings 365, 367 by a line 375.

Figure 10:
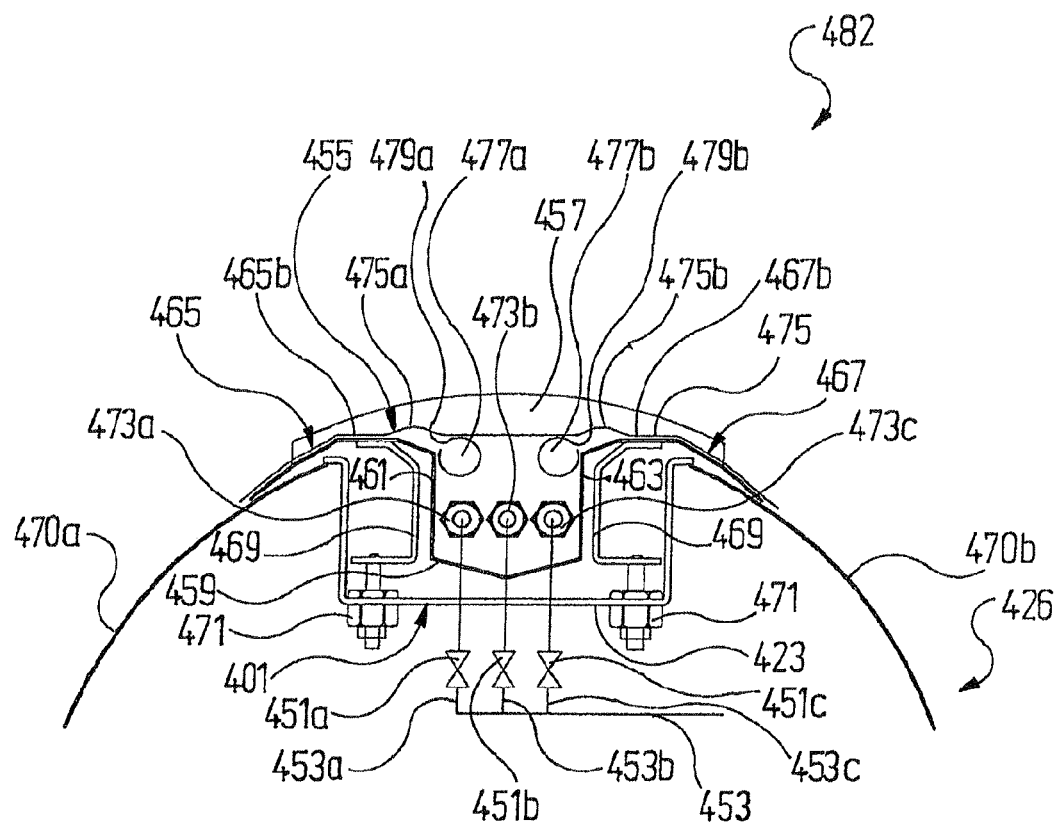

FIG. 10 shows, as a further exemplary embodiment, a discharge means 482 which takes the form of an overflow means, in which components corresponding to those of the discharge means 382 in FIG. 8 are designated by the same reference numerals plus 100.

The discharge means 482 differs from the discharge means 482 in FIG. 8 only in that there is arranged, at the level of the transition from the side walls 461 and 463 to the overflow wings 465 and 467, but below the outflow level for the separating liquid, a respective compressed air pipe 477a, 477b which may be acted upon by compressed air from a compressed air source which is not itself shown. Each of the compressed air pipes 477a, 477b has an exhaust slot 479a, 479b which runs along its longitudinal extent, or a plurality of exhaust openings arranged along its longitudinal extent, and is arranged such that compressed air flowing out of the respective exhaust slot 479a, 479b can be blown from below obliquely in the direction of the separating liquid level 475. In this way, a respective wave 475a, 475b which migrates over the respective overflow wing 465, 467 is formed at the liquid level 475. This is favourable for the formation in each case of a cohesive film of the separating liquid flowing to the curved flank 470a, 470b of the separating unit 426.

Figure 11:
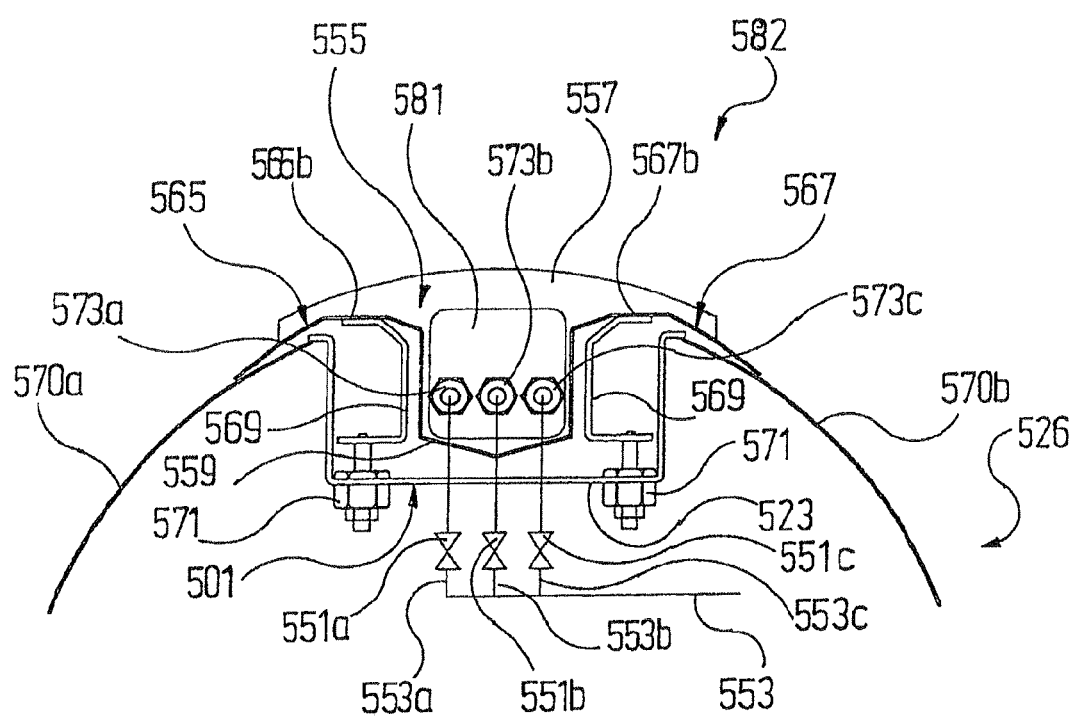

FIG. 11 shows, as a further exemplary embodiment, a discharge means 582 which takes the form of an overflow means, in which components corresponding to those of the discharge means 382 in FIG. 8 are designated by the same reference numerals plus 200.

Unlike the discharge means 382 in FIG. 8, the discharge means 582 includes a distributing medium 581 in the form of a porous material which surrounds and encapsulates the charging pipes 573a, 573b and 573c in the overflow channel 555. An example of a possible porous material is foam.

The distributing medium 581 has the effect of making the separating liquid flow out of the overflow channel 555 more evenly, as a result of which a cohesive film of the separating liquid is reliably produced on both sides of the overflow channel 555 on the overflow wings 565, 567 thereof.

Figure 12:
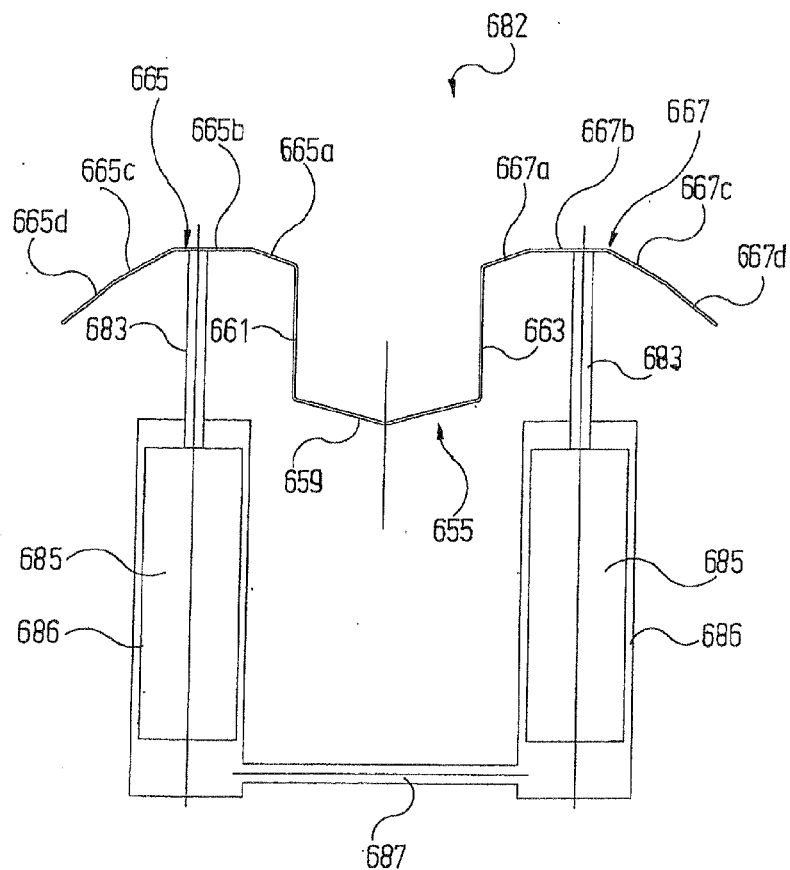

FIG. 12 shows, as a further exemplary embodiment, a discharge means 682 which takes the form of an overflow means, in which components corresponding to those of the discharge means 382 in FIG. 8 are designated by the same reference numerals plus 300.

Whereas in the discharge means 382 in FIG. 8 the setscrews 371 that cooperate with the spacer members 369 are provided to level the overflow channel 355, the overflow channel 655 of the discharge means 682 is mounted, by way of its overflow wings 665 and 667, by four carrying webs 683 on four floating bodies 685, of which only a respective two are visible in FIG. 12. The floating bodies 685 are for their part arranged in each case in a tank 686 filled with a carrying fluid, in particular water, with the result that the floating bodies 685 may be moved in the vertical direction. The tanks 686 are in fluid connection with one another close to the base, with the result that the carrying fluid may be exchanged between the tanks 686. In FIG. 12, only one connection line 687 is shown between the two tanks 686 that are visible there.

The overflow channel 655 which is thus mounted to float has the effect of automatically levelling the overflow channel 655 in relation to a horizontal plane in a manner independent of the alignment and position of the associated separating unit 626.

Apart from the floating mounting of the overflow channel 655 mentioned above, the discharge means 682 may correspond to the discharge means 382, 482 or 582 in FIGS. 8, 10 and 11.

Figure 13:
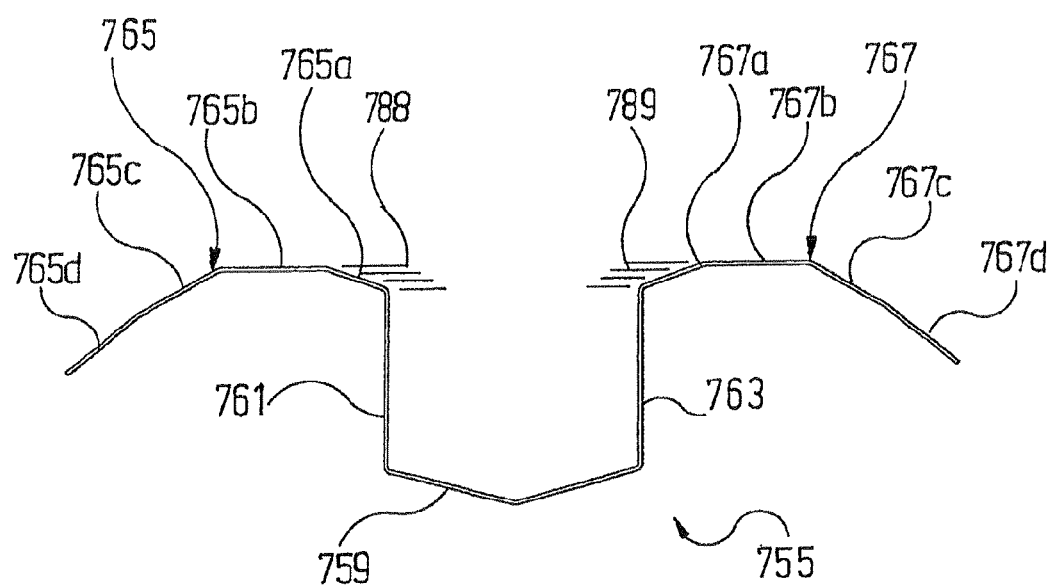

FIG. 13 shows a modified overflow channel 755 of a discharge means 782 which takes the form of an overflow means and which, apart from the overflow channel 755, may correspond to the discharge means 382, 482, 582 and 682 described above. Unlike the overflow channels 355, 455, 555 and 655, the overflow channel 755 includes two brushes 788 and 789 which each run along the upwardly inclined first section 765a and 767a respectively of the overflow wings 765 and 767. The bristles of the brushes 788 and 789 lie opposite one another.

The brushes 788 and 789 have the effect of making the separating liquid flow up out of the overflow channel 755 more evenly, as a result of which a cohesive film of the separating liquid is reliably produced in the region of the overflow wings 765, 767.

Figure 14:
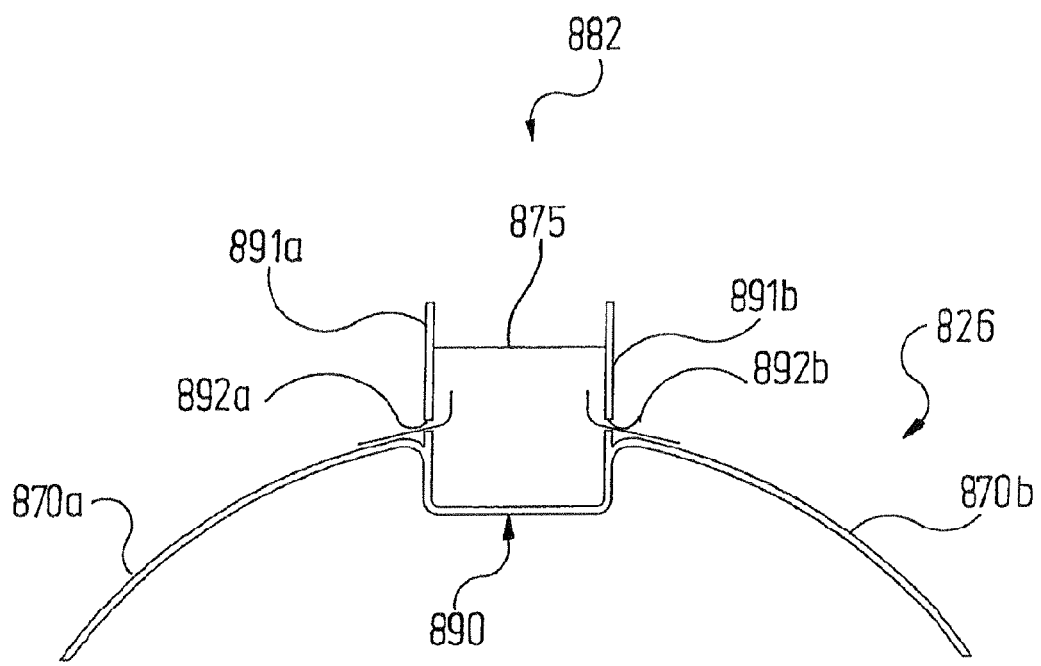

In the exemplary embodiment of a discharge means 882 shown in FIG. 14, components which have been described in conjunction with the separating unit 26 are designated by the same reference numerals plus 800.

In the case of the discharge means 882, a channel 890 is formed at the apex of the curved section 838 of the separating unit 826. Above the edges of the channel 890, vertical walls 891a, 891b are arranged such that in each case a slot 892a, 892b which runs in the longitudinal direction of the separating unit 826 is left between them. The vertical walls, 891a, 891b are held by the end walls 850a, 850b of the separating unit 826, not themselves shown in FIG. 14.

The channel 890 is charged in the manner described above in relation to the discharge means 282 to 782. Once the level of the separating liquid in the channel 890 reaches the slots 892a, 892b, separating liquid flows out of the channel 890 in the direction of the curved flanks 870a, 870b of the separating unit 826.

It is possible briefly to supply more separating liquid to the channel 890 than can flow through the slots 892a, 892b. In this case the level of separating liquid rises and is in the region of the side walls 891a, 891b. The quantity per unit time at which the separating liquid is discharged from the discharge trough 890 through the slots 892a, 892b and reaches the curved flanks 870a, 870b of the separating unit 826 can be adjusted by way of the height at which the level of the separating liquid lies above the slots 892a, 892b. In this case the curved flanks 870a, 870b of the separating unit 826 form drainage surfaces which are associated with the channel 890.

Figure 15:
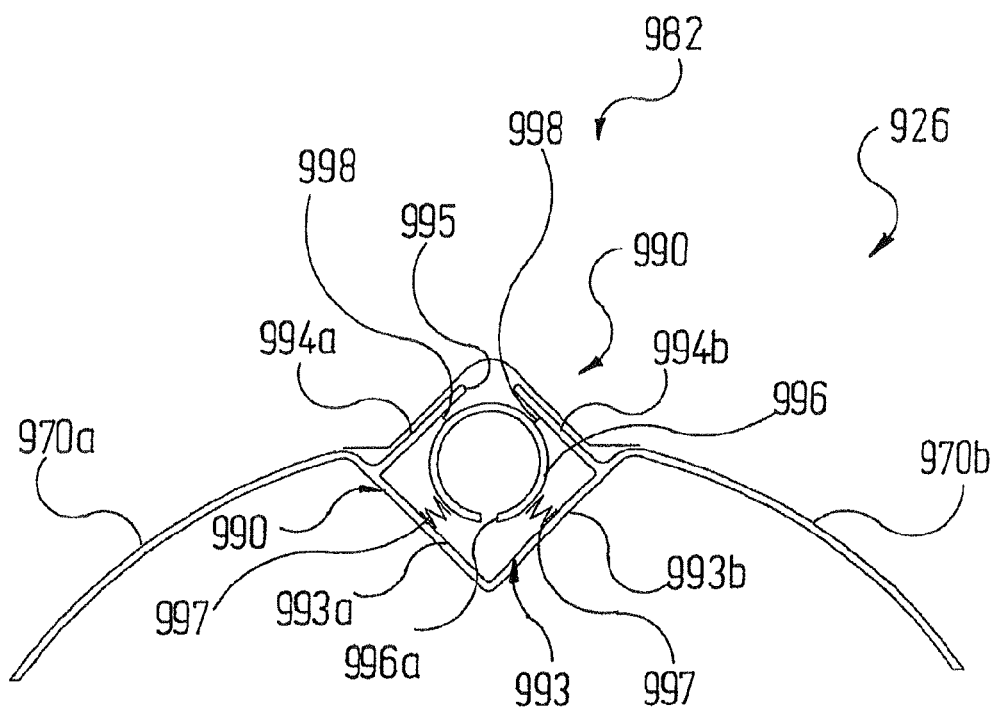

FIG. 15 shows, as a further exemplary embodiment, a discharge means 982 which takes the form of an overflow means, in which components corresponding to those of the discharge means 882 in FIG. 14 are designated by the same reference numerals plus 100.

In the case of the discharge means 982, the overflow channel 990 has a V-shaped floor 993 with two floor sections 993a, 993b which are at a right angle to one another and, starting from the curved flanks 970a, 970b of the separating unit 926, extend downwards. Adjacent to the respective curved flanks 970a, 970b, each section 993a, 993b of the overflow channel 990 carries an upper delimiting wall 994a, 994b, with the delimiting wall 924a running parallel to the section 993b and the delimiting wall 994b running parallel to the section 993a of the floor 993 of the overflow channel 990.

Opposite the apex of the V-shaped floor 993 of the overflow channel 990 a spacing is left between the free edges of the upper delimiting walls 994a, 994b, as a result of which an outflow slot 995 is formed along the overflow channel 990, and separating liquid may flow out over the top of the overflow channel 990 through this outflow slot 995.

Inside the overflow channel 990 there runs a pipe 996 which is slotted in the longitudinal direction and can be fed with separating liquid by way of the supply line 953, which is not itself shown here. The pipe 996 is mounted on the inner face of the sections 993a, 993b of the floor 993 of the overflow channel 990 by way of a plurality of springs 997, as a result of which the pipe 996 is pressed upwards. Spacers 998 against which the pipe 996 bears as a result of the action of the springs are arranged at regular intervals on the inner face of the upper delimiting walls 994a, 994b of the overflow channel 990. The slotted pipe 996 is arranged such that its slot 996a points vertically downwards.

The separating liquid fed into the slotted pipe 996 leaves it through the slot 996a thereof and enters the overflow channel 990 and rises therein. Because of the bottleneck defined by the spacing between the slotted pipe 996 and the upper delimiting walls 994a, 994b of the overflow channel 990, the separating liquid undergoes acceleration there, as a result of which eddies and turbulence form in the separating liquid. These in turn make the outflow of separating liquid through the discharge slot 995 more even, as a result of which the separating liquid passes over the outer faces of the upper delimiting walls 994a, 994b of the overflow channel 990—which form drainage faces associated therewith—in the form of a cohesive film, to reach the curved flanks 970a, 970b of the separating unit 926.

Figure 16:
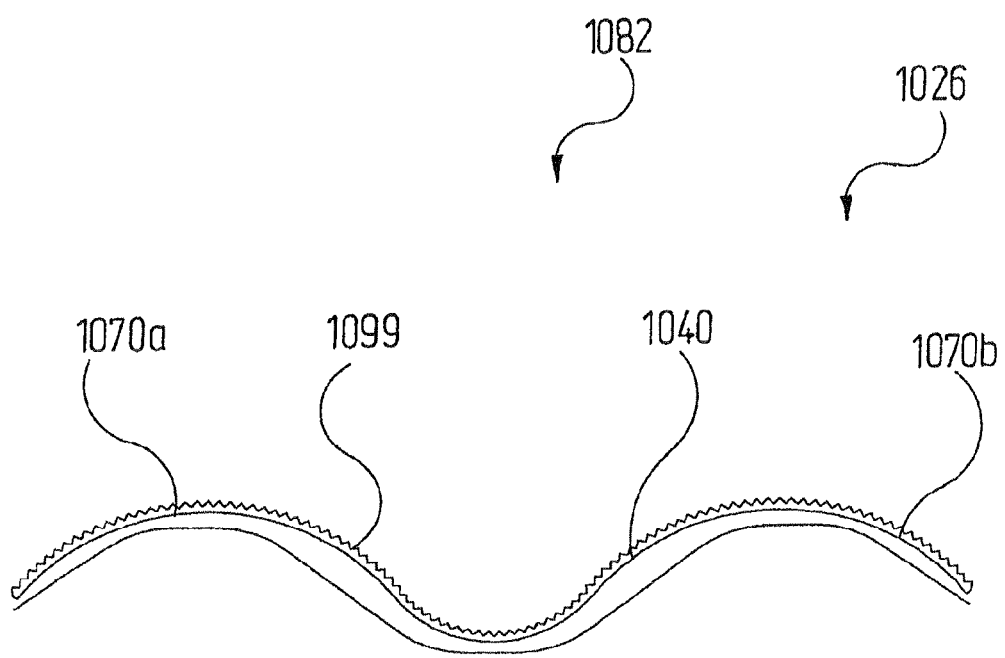

FIG. 16 shows, as a further exemplary embodiment, a discharge means 1082 which takes the form of an overflow means. This includes an overflow channel 1040 which corresponds to the overflow channels 40 and 140 described in conjunction with FIGS. 1 to 6 and which can be charged with separating liquid in the manner described there.

In the case of the discharge means 1082, the surfaces of the overflow channel 1040 that come into contact with the separating liquid and the curved flanks 1070a and 1070b of the separating unit 1026, which serve as a drainage surface associated with the overflow channel 1040, are provided with a grooved structure 1099 whereof the grooves extend in the longitudinal direction of the separating unit 1026.

The grooved structure 1099 may for example take the form of a metal sheet which is provided with grooves and is adapted to the external contour of the overflow channel 1040 and the curved flanks 1070a and 1070b of the separating unit 1026, or a flexible synthetic or rubber mat which is provided with grooves, these being inserted in the overflow channel 1040 and lying on the curved flanks 1070a and 1070b of the separating unit 1026.

The quantity of separating liquid which overflows over the grooved structure 1099 is for example 250 ml per linear meter of the overflow channel 1040 per minute. With this quantity of overflow, a cohesive film of separating liquid is reliably formed thereon.

This grooved structure 1099 has the effect that the separating liquid is distributed over the surfaces in question such that it is ensured that the separating liquid reaches the separating faces 1042a, 1042b of the separating unit 1026 as a cohesive film.

Figure 17:
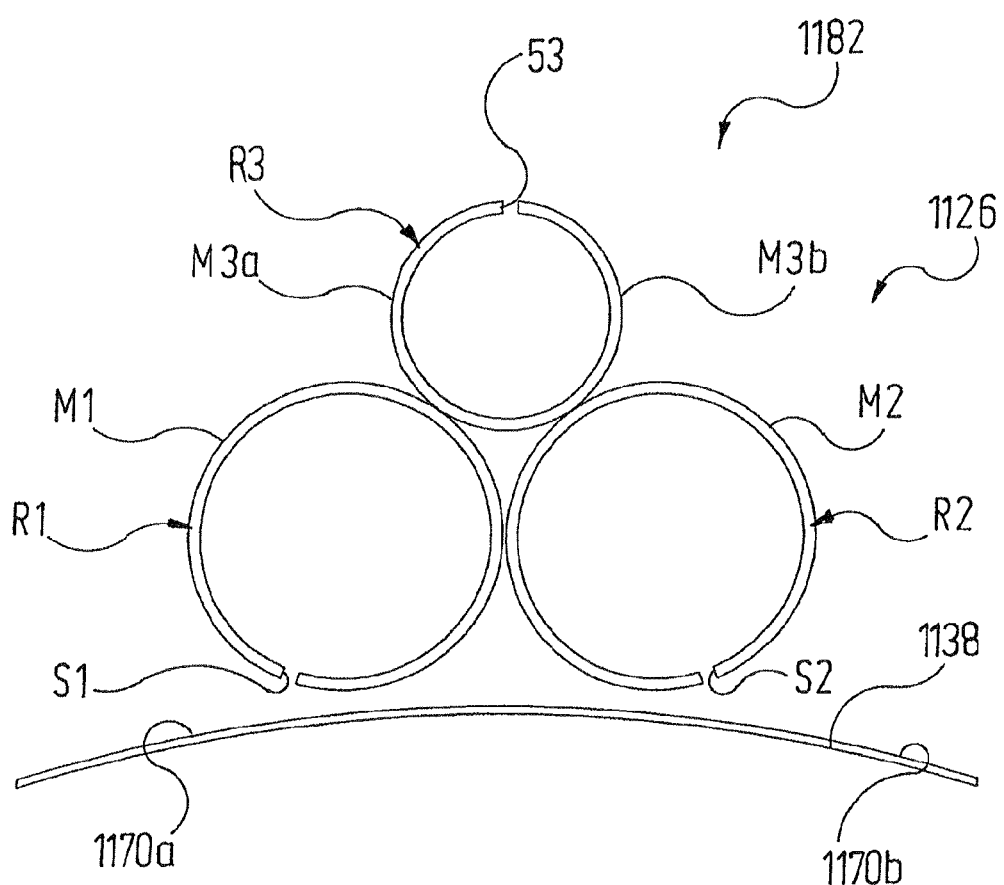

FIG. 17 shows, as a further exemplary embodiment, a discharge means 1182 which takes the form of an overflow means and which can cooperate with a separating unit 1126 in which the curved section 1138 seamlessly connects the two separating surfaces 1142a, 1142b and the side panels 1136a, 1136b of the separating unit 1126 to one another without the formation of a channel. The discharge means 1182 includes three pipes R1, R2, R3 which extend in the longitudinal direction of the separating unit 1126, namely two lower pipes R1, R2 and an upper pipe R3, each of which has a longitudinal slot S1, S2, S3 in the longitudinal direction. Instead of the slots S1, S2, S3, it is also possible for a plurality of outlet openings to be provided along the longitudinal extent of the respective pipe R1, R2, R3. The longitudinal axes of the lower pipes R1 and R2 lie in a common horizontal plane, whereas the upper pipe R3 is carried by the two outer surfaces of the pipes R1 and R2 and runs axially parallel thereto. Thus, the axes of the three pipes R1, R2 and R3 form a triangle as seen in cross section.

The pipes R1, R2 and R3 are charged with separating liquid in the manner described above. The slots S1 and S2 of the two lower pipes R1 and R2 are arranged such that separating liquid in each case flows out to the side and downwards out of the corresponding pipe R1 and R2 and over the curved flank 1170a and 1170b, and can reach the side panels 1126a, 1126b of the separating unit 1126. The slot S3 of the upper pipe R3 points upwards, with the result that the pipe R3 forms an overflow channel and separating liquid that flows up out of the pipe R3 reaches the first pipe R1 and the second pipe R2 respectively on both sides of the slot S3 by way of the outer surfaces M3a and M3b of the pipe R3, flows over the outer surface M1 and M2 thereof onto the curved flanks 1170a, 1170b of the separating unit 1126 and there combines with the separating liquid flowing out of the pipe R1 and the pipe R2 respectively. A cohesive film of the separating liquid then flows to the separating surfaces 1142a, 1142b of the separating unit 1126. The regions of the outer surfaces M1, M2 and M3*a*, M3*b* of the pipes R1, R2 and R3 over which the separating liquid flows here form drainage surfaces which are associated with the pipe R3, which forms the overflow channel.

As can be seen in FIG. 17, the upper pipe R3 has a smaller internal diameter than the two lower pipes R1 and R2. The position of the pipes R1, R2 and R3 in relation to a horizontal plane is adjustable. For this purpose, the pipes R1, R2, R3 are for example borne at their ends such that the vertical position of the ends can be varied.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A device for separating paint overspray from the exhaust air, laden with overspray, of a booth of painting plant, having
   a) at least one separating surface along which a booth exhaust air can be guided and which is connected to a first pole of a high-voltage source;
   b) an electrode means which is arranged in the booth exhaust air and is associated with the at least one separating surface and is connected to a second pole of the high-voltage source; and,
   c) means which can be used to transport paint overspray that is separated off away from the separating surface, wherein
   d) the means for transporting away the paint overspray from the separating surface include a separating liquid which flows downwards over the separating surface; and, wherein
   e) a discharge means is provided which has an upwardly open channel out of which separating liquid supplied thereto flows along a longitudinal extent thereof when the level of separating liquid in the channel exceeds an outflow level and reaches the separating surface in such a manner that the separating liquid on the separating surface flows down as a largely cohesive film,
      wherein the discharge means includes a drainage surface which is associated with the channel and runs parallel thereto and over which the separating liquid flows out of the channel laterally in the direction of the separating surface, and
      wherein the drainage surface has a first section which is inclined outwards and upwards and merges into a second section which runs in a horizontal plane.

2. The device of claim 1, wherein the drainage surface merges along the channel into the edge thereof.

3. The device of claim 1, wherein the separating surface carries a brush element.

4. The device of claim 1, wherein substantially vertical walls are arranged above edges of the channel such that a slot running in a longitudinal direction of the channel is in each case left between the substantially vertical walls.

5. The device of claim 1, wherein the channel tapers upwards into an outflow slot, with a bottleneck being provided in a path of flow of the separating liquid towards the outflow slot, such that the separating liquid is accelerated and undergoes turbulence there.

6. The device of claim 1, wherein the channel and/or the associated drainage surface is provided with a groove structure, preferably made of synthetic or rubber material, the grooves whereof extend in a longitudinal direction of the channel.

7. The device of claim 1, wherein the discharge means includes at least one roller projecting into the channel and rotatable about an axis of rotation which runs parallel to a longitudinal direction of the channel, such that the separating liquid in the channel is carried upwards by the rotating roller, the drainage surface being the surface of a stripping element, in particular a resilient plate, which bears in a longitudinal direction of the roller against the outer surface thereof such that the separating liquid carried along by the roller is stripped off and flows away, over the surface of the stripping element, in the direction of the separating surface.

8. The device of claim 1, wherein the separating liquid is supplied to the channel below the outflow level.

9. The device of claim 8, wherein there is arranged in the channel, in a longitudinal direction thereof, at least one pipe on which the separating liquid may act and along the longitudinal extent whereof a plurality of outlet openings is provided.

10. The device of claim 1, wherein a horizontal position of the channel in relation to a component carrying it is variable.

11. The device of claim 1, wherein a horizontal position of the drainage surface associated with the channel in relation to a component carrying the channel is variable.

12. The device of claim 10, wherein the channel or a component defining the drainage surface is mounted to be floating as a result of a carrier fluid or wherein the channel and a component defining the drainage surface are mounted to be floating as a result of a carrier fluid.

13. The device of claim 1, wherein a compressed air means is provided in the channel and may be used to blow compressed air, below the outflow level, from below onto the separating liquid level, such that waves are produced in the separating liquid in a region of the drainage surface.

14. The device of claim 1, wherein a distributing medium, in particular a porous material, through which the separating liquid may flow is arranged in the channel in the longitudinal direction thereof.

15. The device of claim 1, wherein the channel takes the form of a first pipe having an upwardly pointing overflow slot which runs along a longitudinal extent of the first pipe, with at least one further pipe being arranged below the first pipe such that the separating liquid flowing out of the first pipe passes over the outer surface thereof and reaches the outer surface of the least one further pipe and from there flows onto the separating surface.

16. The device of claim 15, wherein the least one further pipe is chargeable with the separating liquid and has an outlet slot which runs along a longitudinal extent thereof and by way of which the separating liquid may be discharged in the direction of the separating surface.

* * * * *